United States Patent
Michaelidis et al.

(10) Patent No.: US 11,993,480 B2
(45) Date of Patent: May 28, 2024

(54) ELEVATOR SHAFT DISTRIBUTED HEALTH LEVEL WITH MECHANIC FEED BACK CONDITION BASED MONITORING

(71) Applicant: OTIS ELEVATOR COMPANY, Farmington, CT (US)

(72) Inventors: Yrinee Michaelidis, Farmington, CT (US); Derk Oscar Pahlke, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1429 days.

(21) Appl. No.: 16/398,910

(22) Filed: Apr. 30, 2019

(65) Prior Publication Data

US 2020/0346890 A1    Nov. 5, 2020

(51) Int. Cl.
  *B66B 1/34* (2006.01)
  *B66B 5/00* (2006.01)
  *H04B 17/318* (2015.01)

(52) U.S. Cl.
  CPC .......... *B66B 1/3461* (2013.01); *B66B 1/3492* (2013.01); *B66B 5/0012* (2013.01); *B66B 5/0018* (2013.01); *H04B 17/318* (2015.01)

(58) Field of Classification Search
  CPC ... B66B 1/3461; B66B 1/3492; B66B 5/0012; B66B 5/0018; B66B 5/0025; B66B 5/0087; B66B 3/002; B66B 3/02; B66B 5/0037; B66B 5/02; H04B 17/318; H04B 17/27; H04B 17/23
  See application file for complete search history.

(56) References Cited

U.S. PATENT DOCUMENTS

| | | | |
|---|---|---|---|
| 9,403,663 B2 * | 8/2016 | Dellarippa | ............ B66B 5/0087 |
| 9,580,276 B2 | 2/2017 | Toutaoui | |
| 10,112,801 B2 | 10/2018 | Madarasz et al. | |
| 11,155,438 B2 * | 10/2021 | Kujala | ............... G01N 21/8851 |

(Continued)

FOREIGN PATENT DOCUMENTS

| | | |
|---|---|---|
| CN | 1317177 C | 5/2007 |
| CN | 102765643 A | 11/2012 |

(Continued)

OTHER PUBLICATIONS

Search Report Issued Jan. 29, 2021, Received Feb. 25, 2021 in U321547EP.

(Continued)

*Primary Examiner* — Jeffrey Donels
(74) *Attorney, Agent, or Firm* — CANTOR COLBURN LLP

(57) ABSTRACT

A method of monitoring a conveyance apparatus within a conveyance system including: obtaining a health level of the conveyance system at a first conveyance apparatus location; determining that the health level for the conveyance system at the first conveyance apparatus location is outside of a threshold operating range; activating an alert on a mobile device indicating that the health level for the conveyance system at the first conveyance apparatus location is outside of the threshold operating range; and receiving a selection input on the mobile device, the selection input indicating a mechanic feedback regarding the health level of the conveyance system at the first conveyance apparatus location.

18 Claims, 5 Drawing Sheets

(56) References Cited

U.S. PATENT DOCUMENTS

| | | | |
|---|---|---|---|
| 2005/0077117 A1* | 4/2005 | Shrum, III | B66B 5/0087 187/391 |
| 2011/0315490 A1* | 12/2011 | Shi | B66B 5/0025 187/393 |
| 2014/0182978 A1 | 7/2014 | Bunter | |
| 2014/0262629 A1* | 9/2014 | Toutaoui | B66B 5/0025 187/393 |
| 2017/0029244 A1* | 2/2017 | Madarasz | B66B 5/0037 |
| 2018/0086597 A1 | 3/2018 | Song et al. | |
| 2018/0273345 A1 | 9/2018 | Rao et al. | |
| 2018/0282112 A1* | 10/2018 | Mahoney | B66B 5/0025 |
| 2018/0346284 A1 | 12/2018 | Swami et al. | |
| 2019/0010022 A1* | 1/2019 | Trcka | G05B 13/0265 |
| 2019/0062109 A1* | 2/2019 | Nanjappan | B66B 5/0056 |
| 2020/0002125 A1* | 1/2020 | Liaskas | G06Q 10/20 |

FOREIGN PATENT DOCUMENTS

| | | |
|---|---|---|
| CN | 104909232 A | 9/2015 |
| CN | 105731209 A | 7/2016 |
| CN | 106144819 A | 11/2016 |
| CN | 106529682 A | 3/2017 |
| CN | 106586748 A | 4/2017 |
| CN | 107161821 A | 9/2017 |
| CN | 105712142 B | 1/2018 |
| CN | 107555279 A | 1/2018 |
| CN | 106379787 B | 5/2018 |
| CN | 108083044 A | 5/2018 |
| CN | 108147242 A | 6/2018 |
| CN | 108861917 A | 11/2018 |
| CN | 106276447 B | 1/2019 |
| EP | 3718944 A1 * | 10/2020 ............ B66B 1/30 |
| JP | 2018095429 A | 6/2018 |
| JP | 2018145005 A | 9/2018 |
| JP | 6416302 B2 | 10/2018 |
| WO | 2012000170 A1 | 1/2012 |
| WO | 2013055346 A1 | 4/2013 |
| WO | 2018050470 A1 | 3/2018 |
| WO | 2018137108 A1 | 8/2018 |
| WO | 2018148967 A1 | 8/2018 |
| WO | 2018148968 A1 | 8/2018 |
| WO | 2018232892 A1 | 12/2018 |

OTHER PUBLICATIONS

Chinese Office Action for Application No. 202010354921.3; dated Jun. 10, 2021; 12 Pages.

* cited by examiner

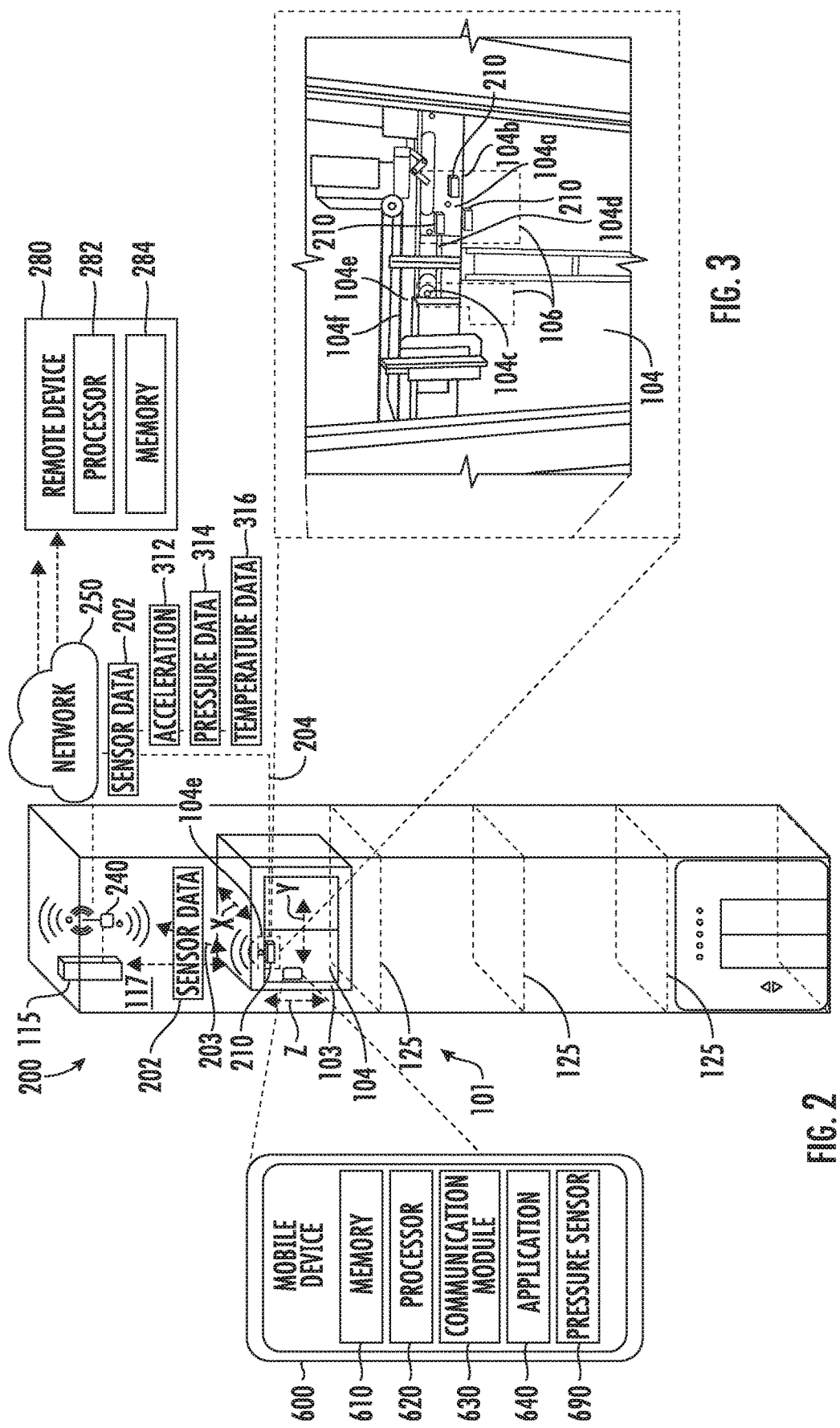

ELEVATOR SHAFT DISTRIBUTED HEALTH LEVEL WITH MECHANIC FEED BACK CONDITION BASED MONITORING

BACKGROUND

The embodiments herein relate to the field of conveyance systems, and specifically to a method and apparatus for monitoring a conveyance apparatus of a conveyance system.

A position of a conveyance apparatus within a conveyance systems, such as, for example, elevator systems, escalator systems, and moving walkways may typically be difficult to determine when performing maintenance.

BRIEF SUMMARY

According to an embodiment, a method of monitoring a conveyance apparatus within a conveyance system is provided. The method including: obtaining a health level of the conveyance system at a first conveyance apparatus location; determining that the health level for the conveyance system at the first conveyance apparatus location is outside of a threshold operating range; activating an alert on a mobile device indicating that the health level for the conveyance system at the first conveyance apparatus location is outside of the threshold operating range; and receiving a selection input on the mobile device, the selection input indicating a mechanic feedback regarding the health level of the conveyance system at the first conveyance apparatus location.

In addition to one or more of the features described herein, or as an alternative, further embodiments may include: displaying the health level for the conveyance system at the first conveyance apparatus location on a display device of the mobile device.

In addition to one or more of the features described herein, or as an alternative, further embodiments may include that receiving the selection input on the mobile device further includes: displaying a plurality of mechanic feedback options; and receiving a selection input on the mobile device selecting one of the plurality of mechanic feedback options indicating the mechanic feedback.

In addition to one or more of the features described herein, or as an alternative, further embodiments may include: adjusting the alert in response to the mechanic feedback.

In addition to one or more of the features described herein, or as an alternative, further embodiments may include: adjusting the threshold operating range in response to the mechanic feedback.

In addition to one or more of the features described herein, or as an alternative, further embodiments may include: identifying a root cause that caused the health level for the conveyance system at the first conveyance apparatus location to be outside of the threshold operating range.

In addition to one or more of the features described herein, or as an alternative, further embodiments may include: the mechanic feedback identifies a root cause that caused the health level for the conveyance system at the first conveyance apparatus location to be outside of the threshold operating range.

In addition to one or more of the features described herein, or as an alternative, further embodiments may include: the mechanic feedback confirms the root cause that was identified.

In addition to one or more of the features described herein, or as an alternative, further embodiments may include that the mechanic feedback rejects the root cause that was identified.

In addition to one or more of the features described herein, or as an alternative, further embodiments may include: obtaining the health level of the conveyance system at the first conveyance apparatus location further includes: detecting, using a sensing apparatus, at the first conveyance apparatus location an acceleration of the conveyance apparatus, temperature data of the conveyance system, and pressure data proximate the conveyance apparatus; and determining a health level of the conveyance system at the first conveyance apparatus location in response to at least one of the acceleration of the conveyance apparatus, the temperature data of the conveyance system, and the pressure data proximate the conveyance apparatus.

In addition to one or more of the features described herein, or as an alternative, further embodiments may include: determining a first identifier for the first conveyance apparatus location; and displaying first identifier for the first conveyance apparatus location on a display device.

In addition to one or more of the features described herein, or as an alternative, further embodiments may include: determining a current location of an individual within the conveyance system; and displaying the location of the individual within the conveyance system on a display device.

In addition to one or more of the features described herein, or as an alternative, further embodiments may include that prior to displaying the first identifier for the first conveyance apparatus location on a display device, the method further includes: normalizing the first identifier for the first conveyance apparatus location to a standard value.

In addition to one or more of the features described herein, or as an alternative, further embodiments may include that determining the current location of the individual within the conveyance system, further includes: detecting an ambient air pressure proximate the individual; and determining an elevation in response to the ambient air pressure.

In addition to one or more of the features described herein, or as an alternative, further embodiments may include that determining the current location of the individual within the conveyance system, further includes: detecting a wireless signal of a mobile device being carried by the individual; and determining received signal strength of the mobile device; and determining an elevation of the individual in response to the received signal strength of the mobile device.

In addition to one or more of the features described herein, or as an alternative, further embodiments may include that determining the current location of the individual within the conveyance system, further includes: determining that the individual is currently located within the conveyance apparatus; determining a current location of the conveyance apparatus; and determining that the current location of the individual is equivalent to the current location of the conveyance apparatus.

In addition to one or more of the features described herein, or as an alternative, further embodiments may include that the conveyance system is an elevator system and the conveyance apparatus is an elevator car.

According to another embodiment, a method of monitoring a conveyance apparatus within a conveyance system is provided. The method including: obtaining a health level of the conveyance system at a first conveyance apparatus location; displaying a health level of the conveyance system at the first conveyance apparatus location on a display device of a mobile device; receiving a selection input on the mobile device, the selection input indicating a mechanic feedback regarding the health level of the conveyance system at the first conveyance apparatus location; and adjusting the health level of the conveyance system at the first conveyance apparatus location in response to the mechanic feedback.

According to another embodiment, a system for monitoring a conveyance apparatus within a conveyance system is provided. The system including: a processor; and a memory including computer-executable instructions that, when executed by the processor, cause the processor to perform operations. The operations including: obtaining a health level of the conveyance system at a first conveyance apparatus location; determining that the health level for the conveyance system at the first conveyance apparatus location is outside of the threshold operating range; activating an alert on a mobile device indicating that the health level for the conveyance system at the first conveyance apparatus location is outside of the threshold operating range; and receiving a selection input on the mobile device, the selection input indicating a mechanic feedback regarding the health level of the conveyance system at the first conveyance apparatus location.

Technical effects of embodiments of the present disclosure include determining a health level of a conveyance system and utilizing feedback from a mechanic to determine whether or not the health level may be problematic.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

FIG. 2 is a schematic illustration of a sensor system for the elevator system of FIG. 1, in accordance with an embodiment of the disclosure;

FIG. 3 is a schematic illustration of the location of sensing apparatus of the sensor system of FIG. 2, in accordance with an embodiment of the disclosure;

DETAILED DESCRIPTION

Figure 1:
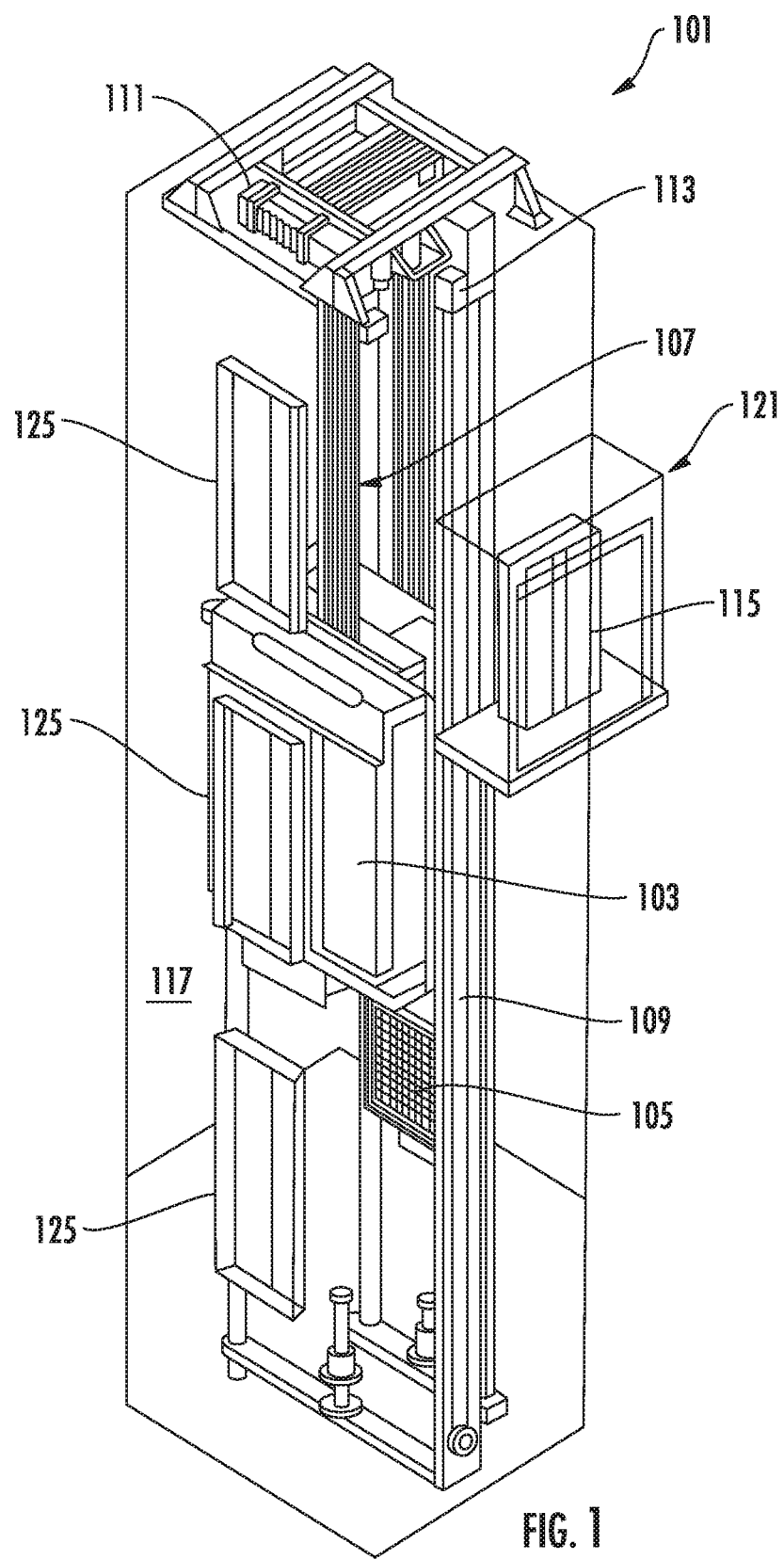
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

Referring now to FIG. 2, with continued referenced to FIG. 1, a view of a sensor system 200 including a sensing apparatus 210 is illustrated, according to an embodiment of the present disclosure. The sensing apparatus 210 is configured to detect sensor data 202 of the elevator car 103 and transmit the sensor data 202 to a remote device 280. Sensor data 202 may include but is not limited to pressure data 314, temperature data 316, vibratory signatures (i.e., vibrations over a period of time) or accelerations 312 and derivatives or integrals of accelerations 312 of the elevator car 103, such as, for example, distance, velocity, jerk, jounce, snap . . . etc. The pressure data 314 may include atmospheric air pressure within the elevator shaft 117. The temperature data 316 may include atmospheric air temperature within the elevator shaft 117 or temperature of specific components of the elevator system 101. Sensor data 202 may also include light, sound, humidity, and, or any other desired data parameter. It should be appreciated that, although particular systems are separately defined in the schematic block diagrams, each or any of the systems may be otherwise combined or separated via hardware and/or software. For example, the sensing apparatus 210 may be a single sensor or may be multiple separate sensors that are interconnected.

In an embodiment, the sensing apparatus 210 is configured to transmit sensor data 202 that is raw and unprocessed to the controller 115 of the elevator system 101 for processing. In another embodiment, the sensing apparatus 210 is configured to process the sensor data 202 prior to transmitting the sensor data 202 to the controller 115 through a processing method, such as, for example, edge processing. In another embodiment, the sensing apparatus 210 is configured to transmit sensor data 202 that is raw and unprocessed to a remote system 280 for processing. In yet another embodiment, the sensing apparatus 210 is configured to process the sensor data 202 prior to transmitting the sensor data 202 to the remote device 280 through a processing method, such as, for example, edge processing.

The processing of the sensor data 202 may reveal data, such as, for example, a number of elevator door openings/closings, elevator door time, vibrations, vibratory signatures, a number of elevator rides, elevator ride performance, elevator flight time, probable car position (e.g. elevation, floor number), relevelling events, rollbacks, elevator car 103 x, y acceleration at a position: (i.e., rail topology), elevator car 103 x, y vibration signatures at a position: (i.e., rail topology), door performance at a landing number, nudging event, vandalism events, emergency stops, component degradation, etc.

The remote device 280 may be a computing device, such as, for example, a desktop, a cloud based computer, and/or a cloud based artificial intelligence (AI) computing system. In an embodiment, the AI may be self-learning and fed by conditions detected by a sensor and a feedback loop provided (e.g. mechanic or human in the loop). In an embodiment, the remote device 280 may be a cloud based AI computing system capable of machine learning, human in the loop machine learning, principal component analysis (PCA), and/or any processing algorithm known to one of skill in the art. The remote device 280 may also be a mobile computing device that is typically carried by a person, such as, for example a smartphone, PDA, smartwatch, tablet, laptop, etc. The remote device 280 may also be two separate devices that are synced together, such as, for example, a cellular phone and a desktop computer synced over an internet connection.

The remote device 280 may be an electronic controller including a processor 282 and an associated memory 284 comprising computer-executable instructions that, when executed by the processor 282, cause the processor 282 to perform various operations. The processor 282 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 284 may be but is not limited to a random access memory (RAM), read only memory (ROM), or other electronic, optical, magnetic or any other computer readable medium.

The sensing apparatus 210 is configured to transmit the sensor data 202 to the controller 115 or the remote device 280 via short-range wireless protocols 203 and/or long-range wireless protocols 204. Short-range wireless protocols 203 may include but are not limited to Bluetooth, Bluetooth low energy, Wi-Fi, HaLow (801.11ah), zWave, Zigbee, or Wireless M-Bus. Using short-range wireless protocols 203, the sensing apparatus 210 is configured to transmit the sensor data 202 to directly to the controller 115 or to a local gateway device 240 and the local gateway device 240 is configured to transmit the sensor data 202 to the remote device 280 through a network 250 or to the controller 115. The network 250 may be a computing network, such as, for example, a cloud computing network, cellular network, or any other computing network known to one of skill in the art. Using long-range wireless protocols 204, the sensing apparatus 210 is configured to transmit the sensor data 202 to the remote device 280 through a network 250. Long-range wireless protocols 204 may include but are not limited to cellular, satellite, LTE (NB-IoT, CAT M1), LoRa, Satellite, Ingenu, SigFox, or weightless.

The sensing apparatus 210 may be configured to detect sensor data 202 including acceleration 312 in any number of directions. In an embodiment, the sensing apparatus may detect accelerations 312 along three axis, an X axis, a Y axis, and a Z axis, as show in in FIG. 2. The X axis may be perpendicular to the doors 104 of the elevator car 103, as shown in FIG. 2. The Y axis may be parallel to the doors 104 of the elevator car 103, as shown in FIG. 2. The Z axis may be aligned vertically parallel with the elevator shaft 117 and pull of gravity, as shown in FIG. 2. The acceleration data 312 may reveal vibratory signatures generated along the X-axis, the Y-axis, and the Z-axis. The vibratory signatures may be utilized to determine a location of the elevator car 103 and/or a health level of the elevator system 101.

Also shown in FIG. 2 is a mobile device 600. The mobile device 600 may belong to an elevator mechanic/technician working on the elevator system 101. The mobile device 600 may be a mobile computing device that is typically carried by a person, such as, for example a smart phone, PDA, smart watch, tablet, laptop, etc. The mobile device 600 may include a display device 650 (see FIG. 6). The mobile device 600 may include a processor 620, memory 610, a communication module 630, and an application 640, as shown in FIG. 2. The processor 620 can be any type or combination of computer processors, such as a microprocessor, microcontroller, digital signal processor, application specific integrated circuit, programmable logic device, and/or field programmable gate array. The memory 610 is an example of a non-transitory computer readable storage medium tangibly embodied in the mobile device 600 including executable instructions stored therein, for instance, as firmware. The communication module 630 may implement one or more communication protocols, such as, for example, short-range wireless protocols 203 and long-range wireless protocols 204. The communication module 630 may be in communication with at least one of the controller 115, the sensing apparatus 210, the network 250, and the remote device 280. The communication module 630 is configured to receive a health level of the elevator system 101 from at least one of the controller 115, the sensing apparatus 210, the network 250, and the remote device 280. In an embodiment, the communication module 630 is configured to receive a health level from the remote device 280. The application 640 is configured to generate a graphical user interface on the mobile device 600. The application 640 may be computer software installed directly on the memory 610 of the mobile device 600 and/or installed remotely and accessible through the mobile device 600 (e.g., software as a service).

The mobile device 600 may also include a pressure sensor 690 configured to detect an ambient air pressure local to the mobile device 600, such as, for example, atmospheric air pressure. The pressure sensor 690 may be a pressure altimeter or barometric altimeter in two non-limiting examples. The pressure sensor 690 is in communication with the processor 620 and the processor 620 may be configured to determine a height or elevation of the mobile device 600 in response to the ambient air pressure detected local to the mobile device 600. A height or elevation of the mobile device 600 may be determined using other location determination methods, including, but not limited to, cell triangulation, a global positioning system (GPS) and/or detection of wireless signal strength (e.g., received signal strength (RSS) using Bluetooth, Wi-FI, . . . etc).

FIG. 3 shows a possible installation location of the sensing apparatus 210 within the elevator system 101. The sensing apparatus 210 may include a magnet (not show) to removably attach to the elevator car 103. In the illustrated embodiment shown in FIG. 3, the sensing apparatus 210 may be installed on the door hanger 104a and/or the door 104 of the elevator system 101. It is understood that the sensing apparatus 210 may also be installed in other locations other than the door hanger 104a and the door 104 of the elevator system 101. It is also understood that multiple sensing apparatus 210 are illustrated in FIG. 3 to show various locations of the sensing apparatus 210 and the embodiments disclosed herein may include one or more sensing apparatus 210. In another embodiment, the sensing apparatus 210 may be attached to a door header 104e of a door 104 of the elevator car 103. In another embodiment, the sensing apparatus 210 may be located on a door header 104e proximate a top portion 104f of the elevator car 103. In another embodiment, the sensing apparatus 210 is installed elsewhere on the elevator car 103, such as, for example, directly on the door 104.

As shown in FIG. 3, the sensing apparatus 201 may be located on the elevator car 103 in the selected areas 106, as shown in FIG. 3. The doors 104 are operably connected to the door header 104e through a door hanger 104a located proximate a top portion 104b of the door 104. The door hanger 104a includes guide wheels 104c that allow the door 104 to slide open and close along a guide rail 104d on the door header 104e. Advantageously, the door hanger 104a is an easy to access area to attach the sensing apparatus 210 because the door hanger 104a is accessible when the elevator car 103 is at landing 125 and the elevator door 104 is open. Thus, installation of the sensing apparatus 210 is possible without taking special measures to take control over the elevator car 103. For example, the additional safety of an emergency door stop to hold the elevator door 104 open is not necessary as door 104 opening at landing 125 is a normal operation mode. The door hanger 104a also provides ample clearance for the sensing apparatus 210 during operation of the elevator car 103, such as, for example, door 104 opening and closing. Due to the mounting location of the sensing apparatus 210 on the door hanger 104a, the sensing apparatus 210 may detect open and close motions (i.e., acceleration) of the door 104 of the elevator car 103 and a door at the landing 125. Additionally mounting the sensing apparatus 210 on the hanger 104a allows for recording of a ride quality of the elevator car 103.

Figure 4:
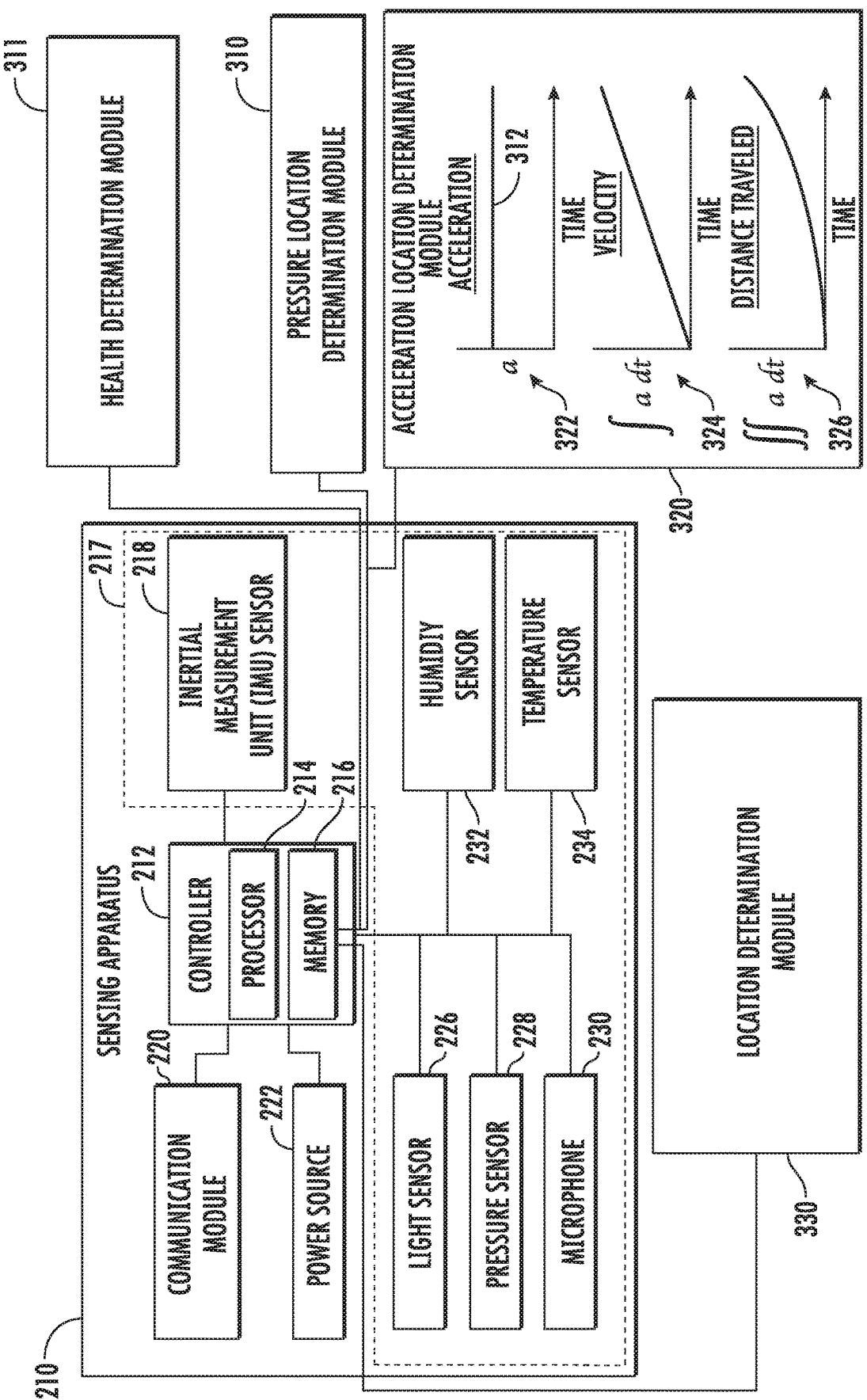
FIG. 4 is a schematic illustration of a sensing apparatus of the sensor system of FIG. 2, in accordance with an embodiment of the disclosure.

FIG. 4 illustrates a block diagram of the sensing apparatus 210 of the sensing system of FIGS. 2 and 3. It should be appreciated that, although particular systems are separately defined in the schematic block diagram of FIG. 4, each or any of the systems may be otherwise combined or separated via hardware and/or software. As shown in FIG. 4, the sensing apparatus 210 may include a controller 212, a plurality of sensors 217 in communication with the controller 212, a communication module 220 in communication with the controller 212, and a power source 222 electrically connected to the controller 212.

The plurality of sensors 217 includes an inertial measurement unit (IMU) sensor 218 configured to detect sensor data 202 including accelerations 312 of the sensing apparatus 210 and the elevator car 103 when the sensing apparatus 210 is attached to the elevator car 103. The IMU sensor 218 may be a sensor, such as, for example, an accelerometer, a gyroscope, or a similar sensor known to one of skill in the art. The accelerations 312 detected by the IMU sensor 218 may include accelerations 312 as well as derivatives or integrals of accelerations, such as, for example, velocity, jerk, jounce, snap . . . etc. The IMU sensor 218 is in communication with the controller 212 of the sensing apparatus 210.

The plurality of sensors 217 includes a pressure sensor 228 configured to detect sensor data 202 including pressure data 314, such as, for example, atmospheric air pressure within the elevator shaft 117. The pressure sensor 228 may be a pressure altimeter or barometric altimeter in two non-limiting examples. The pressure sensor 228 is in communication with the controller 212.

The plurality of sensors 217 may also include additional sensors including but not limited to a light sensor 226, a pressure sensor 228, a microphone 230, a humidity sensor 232, and a temperature sensor 234. The light sensor 226 is configured to detect sensor data 202 including light exposure. The light sensor 226 is in communication with the controller 212. The microphone 230 is configured to detect sensor data 202 including audible sound and sound levels. The microphone 230 is in communication with the controller 212. The humidity sensor 232 is configured to detect sensor data 202 including humidity levels. The humidity sensor 232 is in communication with the controller 212. The temperature sensor 234 is configured to detect sensor data 202 including temperature data 316. The temperature sensor 234 is in communication with the controller 212.

The controller 212 of the sensing apparatus 210 includes a processor 214 and an associated memory 216 comprising computer-executable instructions that, when executed by the processor 214, cause the processor 214 to perform various operations, such as, for example, edge pre-processing or processing the sensor data 202 collected by the IMU sensor 218, the light sensor 226, the pressure sensor 228, the microphone 230, the humidity sensor 232, and the temperature sensor 234. In an embodiment, the controller 212 may process the accelerations 312 and/or the pressure data 314 in order to determine a probable location of the elevator car 103, discussed further below. In an embodiment, the controller 212 may use edge processing to pre-process the accelerations 312, the pressure data 314, and temperature data 316, then transmit the accelerations 312, the pressure data 314, and temperature data 316 that has been edge pre-processed to the remote device 280 to determine a health level.

The processor 214 may be but is not limited to a single-processor or multi-processor system of any of a wide array of possible architectures, including neuromorphic processor unit (NPU), field programmable gate array (FPGA), central processing unit (CPU), application specific integrated circuits (ASIC), digital signal processor (DSP) or graphics processing unit (GPU) hardware arranged homogenously or heterogeneously. The memory 216 may be a storage device, such as, for example, a random access memory (RAM), read only memory (ROM), or other electronic, optical, magnetic or any other computer readable medium.

The power source 222 of the sensing apparatus 210 is configured to store and supply electrical power to the sensing apparatus 210. The power source 222 may include an energy storage system, such as, for example, a battery system, capacitor, or other energy storage system known to one of skill in the art. The power source 222 may also generate electrical power for the sensing apparatus 210. The power source 222 may also include an energy generation or electricity harvesting system, such as, for example synchronous generator, induction generator, or other type of electrical generator known to one of skill in the art.

The sensing apparatus 210 includes a communication module 220 configured to allow the controller 212 of the sensing apparatus 210 to communicate with the remote device 280 and/or controller 115 through at least one of short-range wireless protocols 203 and long-range wireless protocols 204. The communication module 220 may be configured to communicate with the remote device 280 using short-range wireless protocols 203, such as, for example, Bluetooth, Wi-Fi, HaLow (801.11ah), Wireless M-Bus, zWave, Zigbee, or other short-range wireless protocol known to one of skill in the art. Using short-range wireless protocols 203, the communication module 220 is configured to transmit the sensor data 202 to a local gateway device 240 and the local gateway device 240 is configured to transmit the sensor data 202 to a remote device 280 through a network 250, as described above. The communication module 220 may be configured to communicate with the remote device 280 using long-range wireless protocols 204, such as for example, cellular, LTE (NB-IoT, CAT M1), LoRa, Ingenu, SigFox, Satellite, or other long-range wireless protocol known to one of skill in the art. Using long-range wireless protocols 204, the communication module 220 is configured to transmit the sensor data 202 to a remote device 280 through a network 250. In an embodiment, the short-range wireless protocol 203 is sub GHz Wireless M-Bus. In another embodiment, the long-range wireless protocol is SigFox. In another embodiment, the long-range wireless protocol is LTE NB-IoT or CAT M1 with 2G fallback.

The sensing apparatus 210 includes a location determination module 330 configured to determine a location (i.e., position) of the elevator car 103 within the elevator shaft 117. The location of the elevator car 103 may be fixed locations along the elevator shaft 117, such as for example, the landings 125 of the elevator shaft 117. The locations may be equidistantly spaced apart along the elevator shaft 117, such as, for example, 5 meters or any other selected distance. Alternatively, the locations may be intermittently spaced apart along the elevator shaft 117.

The location determination module 330 may utilize various approaches to determine a location of the elevator car 103 within the elevator shaft 117. The location determination module 330 may be configured to determine a location of the elevator car 103 within the elevator shaft 117 using at least one of a pressure location determination module 310 and an acceleration location determination module 320.

The acceleration location determination module 320 is configured to determine a distance traveled of the elevator car 103 within the elevator shaft 117 in response to the acceleration of the elevator car 103 detected along the Y axis. The sensing apparatus 210 may detect an acceleration along the Y axis shown at 322 and may integrate the acceleration to get a velocity of the elevator car 103 at 324. At 326, the sensing apparatus 210 may also integrate the velocity of the elevator car 103 to determine a distance traveled by the elevator car 103 within the elevator shaft 117 during the acceleration 312 detected at 322. The direction of travel of the elevator car 103 may also be determined in response to the acceleration 312 detected. The location determination module 330 may then determine the location of the elevator car 103 within the elevator shaft 117 in response to a starting location and a distance traveled away from that starting location. The starting location may be based upon tracking the past operation and/or movement of the elevator car 103.

The pressure location determination module 310 is configured to detect an atmospheric air pressure within the elevator shaft 117 when the elevator car 103 is in motion and/or stationary using the pressure sensor 228. The pressure detected by the pressure sensor 228 may be associated with a location (e.g., height, elevation) within the elevator shaft 117 through either a look up table or a calculation of altitude using the barometric pressure change in two non-limiting embodiments. The direction of travel of the elevator car 103 may also be determined in response to the change in pressure detected via the pressure data 314. The pressure sensor 228 may need to periodically detect a baseline pressure to account for changes in atmospheric pressure due to local weather conditions. For example, this baseline pressure may need to be detected daily, hourly, or weekly in non-limiting embodiments. In some embodiments, the baseline pressure may be detected whenever the elevator car 103 is stationary, or at certain intervals when the elevator car 103 is stationary and/or at a known location. The acceleration of the elevator car 103 may also need to be detected to know when the elevator car 103 is stationary and then when the elevator car 103 is stationary the sensing apparatus 210 may need to be offset to compensate the sensor drift and environment drift.

In one embodiment, the pressure location determination module 310 may be used to verify and/or modify a location of the elevator car 102 within the elevator shaft 117 determined by the acceleration location determination module 320. In another embodiment, the acceleration location determination module 320 may be used to verify and/or modify a location of the elevator car 102 within the elevator shaft 117 determined by the pressure location determination module 310. In another embodiment, the pressure location determination module 310 may be prompted to determine a location of the elevator car 103 within the elevator shaft 117 in response to an acceleration detected by the IMU sensor 218.

In an embodiment, health determination module 311 of the sensing apparatus 210 may edge process or remote device 280 may process the sound detected by the microphone 230, the light detected by the light sensor 226, the humidity detected by the humidity sensor 232, the temperature data 316 detected by the temperature sensor 234, the accelerations 312 detected by the IM sensor 218, and/or the pressure data 314 detected by the pressure sensor 228 in order to determine a health level 710 (see FIG. 6) of the elevator system 101. In an embodiment, the remote device 280 may process the temperature data 316 detected by the temperature sensor 234, the accelerations 312 detected by the IMU sensor 218, and the pressure data 314 detected by the pressure sensor 228 in order to determine a health level 710 (see FIG. 6) of the elevator system 101. The health level may be a graded scale indicating the health of the elevator system 101 and/or components of the elevator system. In a non-limiting example, the health level may be graded on a scale of one-to-ten with a health level equivalent to one being the lowest health level and a health level equivalent to ten being the highest health level. In another non-limiting example, the health level may be graded on a scale of one-to-one-hundred percent with a health level equivalent to one percent being the lowest health level and a health level equivalent to one-hundred percent being the highest health level. In another non-limiting example, the health level may be graded on a scale of colors with a health level equivalent to red being the lowest health level and a health level equivalent to green being the highest health level. The health level may be determined in response to at least one of the accelerations 312, the pressure data 314, and/or the temperature data 316. For example, accelerations 312 above a threshold acceleration (e.g., normal operating acceleration) in any one of the X axis, a Y axis, and a Z axis may be indicative of a low health level. In another example, elevated temperature data 316 above a threshold temperature for components may be indicative of a low health level.

The remote device 280 is configured to assign a determined health level to locations along the elevator shaft 117 where the health level was determined. The health level may then be communicated to the mobile device 600 where it is visible to a user of the mobile device 600. The health level of the elevator system 101 may be determined at various location along the elevator shaft 117. In one example, the health level of the elevator system 101 may be determined equidistantly along the elevator shaft 117. In another example, the health level of the elevator system 101 may be determined at each landing 125 along the elevator shaft 117.

Figure 6:
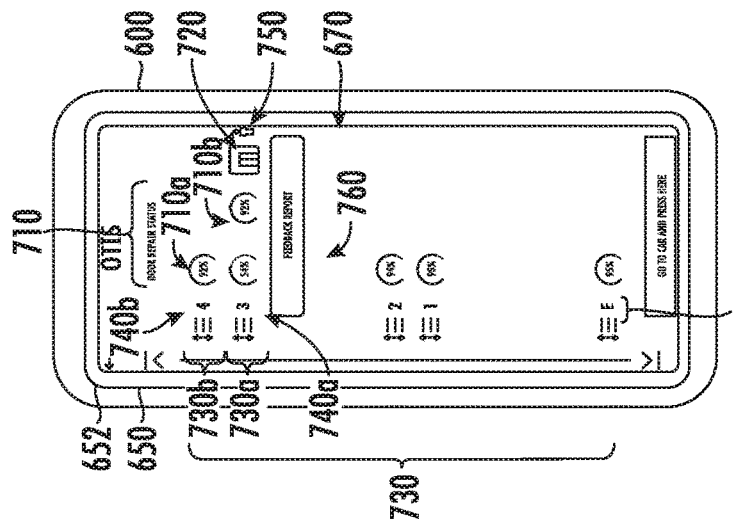
FIG. 6 illustrates a mobile device graphical user interface for viewing and interacting with an application, in accordance with an embodiment of the disclosure.
Figure 5:
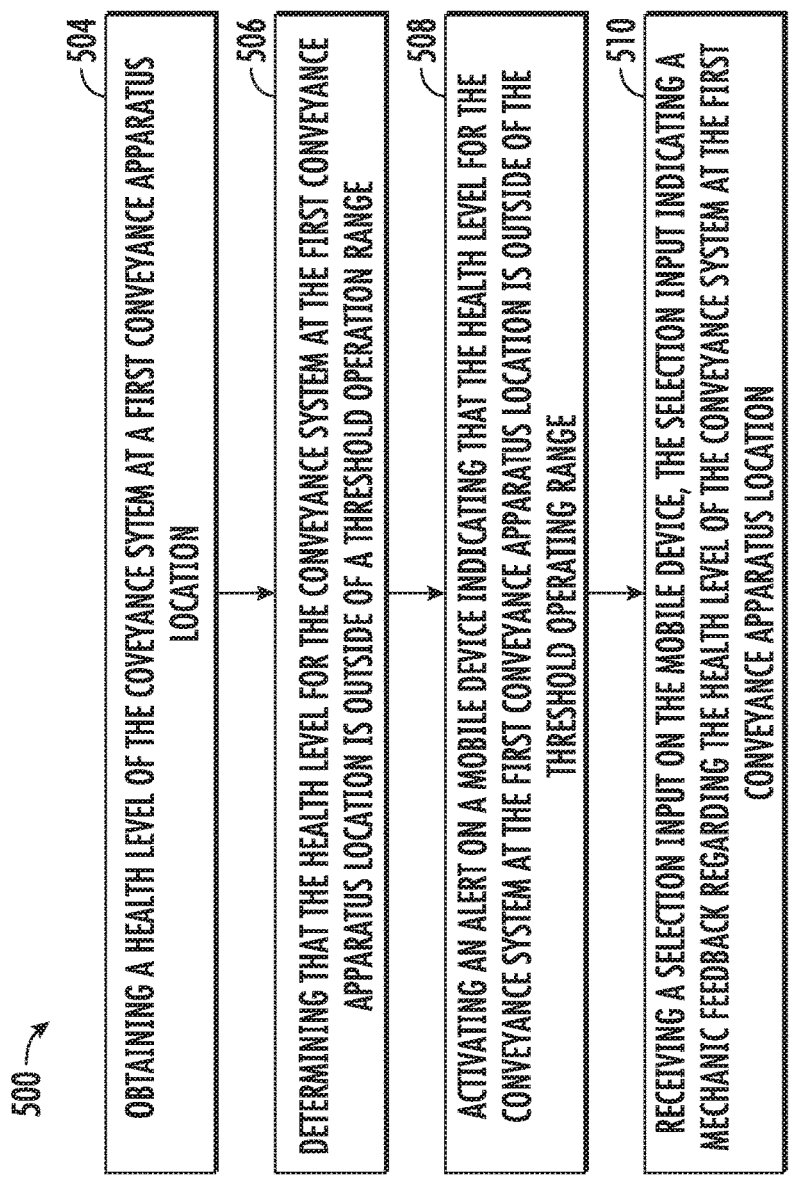
FIG. 5 is a flow chart of a method of monitoring a conveyance apparatus within a conveyance system, in accordance with an embodiment of the disclosure.
Figure 8:
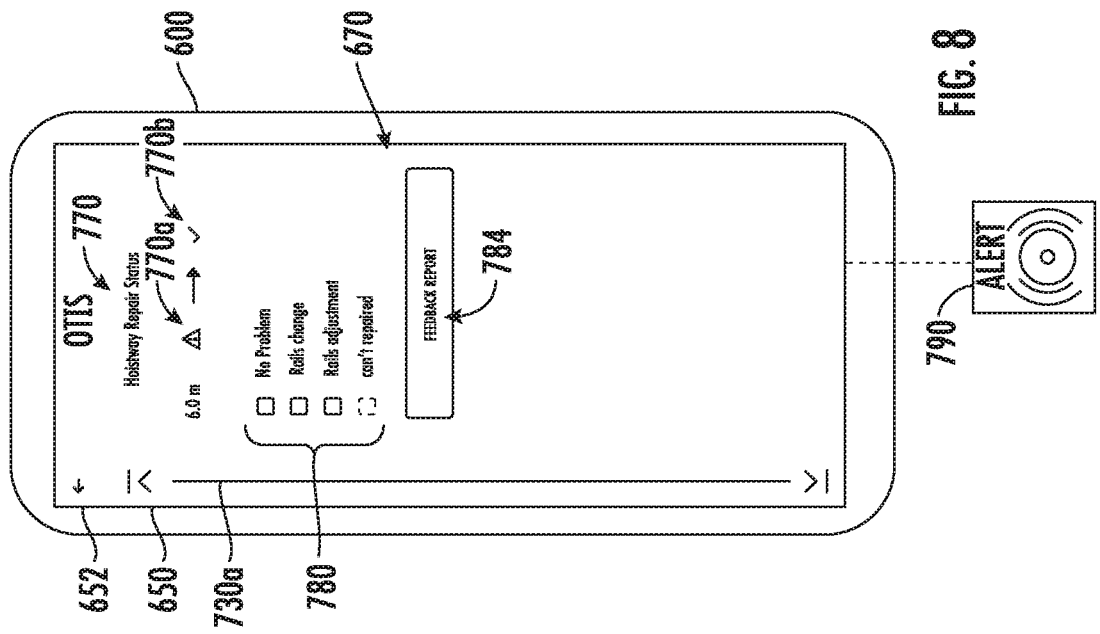
FIG. 8 illustrates a mobile device graphical user interface for viewing and interacting with an application, in accordance with an embodiment of the disclosure.
Figure 7:
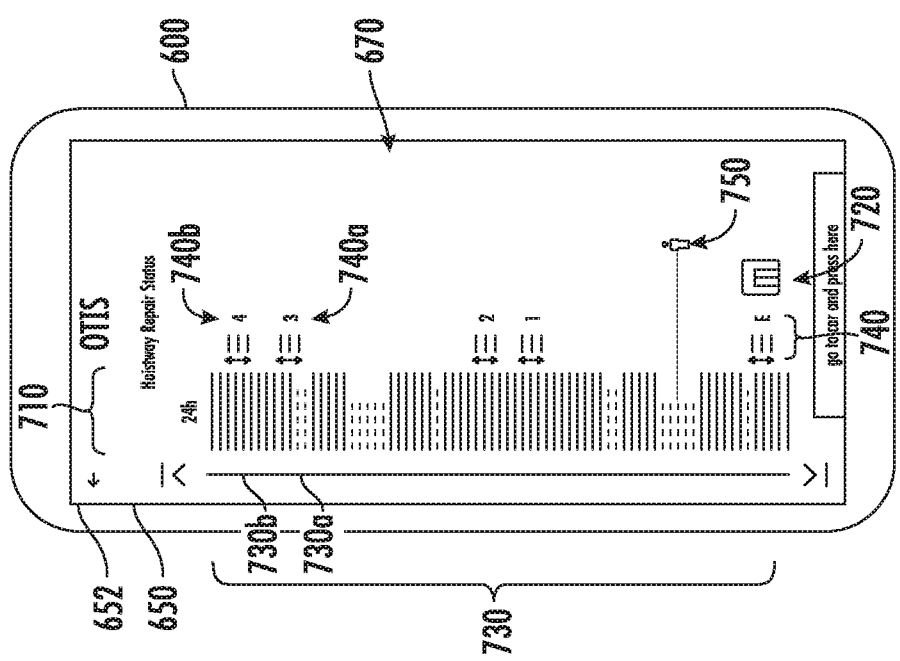
FIG. 7 illustrates a mobile device graphical user interface for viewing and interacting with an application, in accordance with an embodiment of the disclosure.

Referring now to FIGS. 5, 6, 7, and 8, with continued reference to FIGS. 1-4. FIG. 5 shows a flow chart of a method 500 of monitoring a conveyance system, in accordance with an embodiment of the present disclosure. In an embodiment, the conveyance system is an elevator system 101 and the conveyance apparatus is an elevator car 103. In another embodiment, the method 500 may be performed by the remote device 280 and/or the application 640. FIGS. 6-8 illustrate a mobile device 600 generating a graphical user interface 670 via display device 650 for viewing and interacting with the application 640 illustrated in FIG. 2. The mobile device 600 may be a laptop computer, smart phone, tablet computer, smart watch, or any other mobile computing device known to one of skill in the art. In the example shown in FIGS. 6-8, the mobile device 600 is a touchscreen smart phone. The mobile device 600 includes an input device 652, such as, example, a mouse, a touch screen, a scroll wheel, a scroll ball, a stylus pen, a microphone, a camera, etc. In the example shown in FIGS. 6-8, since the mobile device 600 is a touchscreen smart phone, then the display device 650 also functions as an input device 652. FIGS. 6-8 illustrates a graphical user interface 670 generated on the display device 650 of the mobile device 600. A user may interact with the graphical user interface 670 through a selection input, such as, for example, a "click", "touch", verbal command, gesture recognition, or any other input to the user interface 670.

At block 504, the health level 710 of the conveyance system at a first conveyance apparatus location 730a is obtained. The the health level 710 of the conveyance system at a first conveyance apparatus location 730a may be obtained by detecting, using a sensing apparatus 210, at the first conveyance apparatus location 730a an acceleration 312 of the conveyance apparatus, temperature data 316 of the conveyance system, and pressure data 314 proximate the conveyance apparatus is detected using a sensing apparatus 210. The health level 710 of the conveyance system at the first conveyance apparatus location 730a may be may be determined in response to at least one of the acceleration 312 of the conveyance apparatus, the temperature data 316 of the conveyance system, and the pressure data 314 proximate the conveyance apparatus. The health level 710 may be the health level of any component of the conveyance system or the overall conveyance system. For example, if the conveyance system is an elevator system 101 then the health level 710 may be the health level of an elevator door 104 or the elevator system 101.

The health level 710 may be obtained at a plurality of conveyance apparatus locations 730, including the first conveyance apparatus location 730a, during normal operation of the conveyance system and/or a specific run of the conveyance apparatus. The plurality of conveyance apparatus location 730 may be equidistantly spaced apart along the conveyance system. For example, if the conveyance system is an elevator system 101 then the plurality of conveyance apparatus locations 730 may be equidistantly spaced apart along the elevator shaft 117 of the elevator system 101. The first conveyance apparatus location 730a and the second conveyance apparatus location 730b are two of the plurality of conveyance apparatus locations 730 that are equidistantly spaced apart along the conveyance system. In another example, if the conveyance system is an elevator system 101 then the plurality of conveyance apparatus locations 730 may be landings 125 of the elevator system 101, as shown in FIG. 6. In another example, if the conveyance system is an elevator system 101 then the plurality of conveyance apparatus locations 730 may be or include locations between landings 125 of the elevator system 101, as shown in FIG. 7.

The health level 710 may include a first health level 710a determined at a first time and a second health level 710b determined at a second time. For example, the first health level 710a may be determined prior to maintenance being performed on the conveyance system and a second health level 710b may be determined after the maintenance is performed on the conveyance system.

The health level 710 for the conveyance system at the first conveyance apparatus location 730a may be displayed on a display device 650 of the mobile device 600. The health level 710 may be displayed as a circular display indicating a percentage of full health, as shown in FIG. 6 or a linear display indicating a percentage a full health, as shown in FIG. 7.

At block 506 it may be determined that the health level 710 for the conveyance system at the first conveyance apparatus location 730a is outside of a threshold operating range, which may indicate that there is a component of the conveyance apparatus that needs to be evaluated by a mechanic or the overall conveyance system may need to be evaluated by a mechanic.

At block 508, an alert 790 may be activated on a mobile device 600 (e.g., a smart phone of a mechanic) indicating that the health level 710 for the conveyance system at the first conveyance apparatus location 530a is outside of the threshold operating range. The alert 790 may be audible, visual, and/or vibratory. The alert 790 may be displayed on the display device 650. The alert 790 may identify the health level 710 for the conveyance system at the first conveyance apparatus location 730a that is outside of the threshold operating range.

At block 510, a selection input on the mobile device 600 is received. The selection input may indicate a mechanic feedback regarding the health level 710 of the conveyance system at the first conveyance apparatus location 730a. The mechanic feedback may be utilized help improve the algorithms utilized by the application 640 and the remote device 280 through human in the loop machine learning. The mechanic feedback may be provided from the mechanic to the application 640 and the remote device 280 through a variety of different methods, as discussed hereinafter.

A mechanic may provide mechanic feedback by selecting a feedback entry icon 760 through a selection input, as shown in FIG. 6. Selecting the feedback entry icon 760 through a selection input may generate a plurality of mechanic feedback options 780 that are displayed on the display device 650 along with a status of the mechanic repair from an issue icon 770a to a completed icon 770b. The issue icon 770a may depict an alert for the elevator system 101 at a location and the completed icon 770b may indicate that the location is now OK, such as, for example, after maintenance was performed, thus providing up-to-date feedback for maintenance being performed in real-time. The plurality of mechanic feedback options 780 may be a list of probable options that the remote device 280 has determined may be the mechanic feedback. For example, the plurality of mechanic feedback options 780 may state: "No problem", "Can't repair", or "Adjustment Required". For elevator door 104 related problems, the plurality of mechanic feedback options 780 may state: "door contact failure caused by dirt or mechanical, electrical problem", "mechanical adjustment after vandalism impact", "track/gib" "door lock", "counterweight spring", "door operator/encoder", "roller", "detection device"; For elevator car 103 related problems, the plurality of mechanic feedback options 780 may state: "Guide shoes/rollers", Rails change", "Rail Adjustment", or "Can't repair". A selection input a selection input on the mobile device 600 selecting one of the plurality of mechanic feedback options 780 indicating the mechanic feedback may be received. Alternatively, the mechanic may manually enter feedback through typing a response or entering a response via a voice memo.

Mechanic may select one or more of the plurality of mechanic feedback options 780 and then select a feedback report submit icon 784 through a selection input to provide the mechanic feedback to the application. The alert 790 may be adjusted in response to the mechanic feedback received. For example, adjusting the alert 790 may mean that the alert 790 is canceled or silenced if the mechanic feedback indicates that there is "no problem". Additionally, the threshold operating range may be adjusted in response to the mechanic feedback. For example, a level of vibrations may have triggered health level 710 outside of the threshold operating range that prompted activation of the alert 790 and the threshold operating range may be adjusted if the mechanic feedback indicates that after review the component is OK with having this level of vibrations or that this level of vibrations should not indicate a health level 710 outside of the threshold operating range. The mechanic feedback may help improve the algorithms utilized by the application 640 and the remote device 280 to more correctly provide the plurality of mechanic feedback options 780 in the future through human in the loop machine learning.

If a health level 710 for the conveyance system at the first conveyance apparatus location 730a is not outside of threshold operating range at block 506 then an alert 790 may not be activated on a mobile device 600; however a mechanic may still provide feedback to adjust the health level 710 when the mechanic see something that should have generated a health level 710 outside of the threshold operating range and activated an alert 790. For example, the health level 710 of the conveyance system at a first conveyance apparatus location 730a may be determined and displayed on a display device 650 of a mobile device 600, then the mechanic could provide mechanic feedback regarding whether the health level 710 is correct. The mechanic feedback may be provided by the mobile device 600 receiving a selection input, which indicates a mechanic feedback regarding the health level 710 of the conveyance system at the first conveyance apparatus location 730a. The health level 710 of the conveyance system at the first conveyance apparatus location 730a may be adjusted in response to the mechanic feedback.

The method 500 may also include identifying a root cause that caused the health level 710 for the conveyance system at the first conveyance apparatus location 730a to be outside of the threshold operating range. One or more root causes may be identified and presented as the plurality of mechanic feedback options 780 for a mechanic to select one. The root cause may be a component of the conveyance system or a specific condition with a component of the conveyance system. For example, if the conveyance system is an elevator system 101, then the root cause may be a guide rail 109 of the elevator system 101 and the specific condition may be a worn guide rail 109 generating excessive vibrations in the elevator system 101, which results in the health 710 level being outside of a threshold operating range. The mechanic feedback provided may confirm the root cause or reject the root cause suggested by the application 640 and the remote device 280. The mechanic feedback provided may also identify a root cause (e.g., component, or a specific condition of a component) that caused the health level 710 for the conveyance system at the first conveyance apparatus location 730a to be outside of a threshold operating range. The mechanic feedback may help improve the algorithms utilized by the application 640 and the remote device 280 to more correctly identify the root cause in the future through human in the loop machine learning.

The method 500 may include that a remote device 280, receives from the sensing apparatus 210 the acceleration 312 of the conveyance apparatus, the temperature data 316 of the conveyance system, and the pressure data 314 proximate the conveyance apparatus. Then the remote device 280 determines the health level 710 of the conveyance system at the first conveyance apparatus location 730a in response to at least one of the acceleration 312 of the conveyance apparatus, the temperature data 316 of the conveyance system, and the pressure data 314 proximate the conveyance apparatus. The sensing apparatus 210 may use edge processing to pre-process the acceleration 312 of the conveyance apparatus, the temperature 316 data proximate the conveyance apparatus, and the pressure data 314 proximate the conveyance apparatus prior to being received by the remote device 280.

The method 500 may also include that a first identifier 740a for the first conveyance apparatus location 730a is determined. For example, if the conveyance system is an elevator system 101 the first identifier 740a may be a formal floor number of a landing 125. The method 500 may further comprise: normalizing the first identifier 740a for the first conveyance apparatus location 730a to a standard value. For example, the bottom floor may be referred to as the first floor however may later be normalized to floor zero, which may be the standard value. In another example, if the conveyance system is an elevator system 101 that has skipped numbering a 13$^{th}$ floor in naming conventions due to superstition, then the first identifier 740a may indicate that the elevator car 103 is at the 14$^{th}$ floor of the elevator system 101 and the 14$^{th}$ floor may be normalized to the 13$^{th}$ floor. In another example, if the conveyance system is an elevator system 101 that has skipped a number of landings 125 in a building to make the building appear larger, then the identifier 740 of each landing 125 may be normalized by starting from the bottom floor at zero and moving up counting each landing 125 and assigning the appropriate sequential (e.g., 1, 2, 3, . . . etc.) identifier 740 to each landing 125. If the health level 710 is obtained at a plurality of conveyance apparatus locations 730 then the identifier 740 of each of the plurality of conveyance apparatus locations 730 may be normalized. The first identifier 740a may also be displayed on the display device 650.

The method 500 may also include that a current location of an individual 750 within the conveyance system is determined. In an embodiment, the current location of the individual 750 within the conveyance system may be determined by: detecting an ambient air pressure proximate the individual; and determining an elevation in response to the ambient air pressure. In an embodiment, the ambient air pressure proximate the individual may be determined using a pressure sensor 690 of a mobile device 600 carried by the individual.

In another embodiment, the current location of the individual 750 within the conveyance system may be determined by: determining that the individual is currently located within the conveyance apparatus; determining a current location of the conveyance apparatus; and determining that the current location of the individual 750 is equivalent to the current location of the conveyance apparatus. In an embodiment, the individual may be determined to be within the conveyance apparatus by tracking a location of a mobile device 600 carried by the individual. The location of the mobile device 600 may be tracked through a height calculation using air pressure sensor data of the mobile device 600, GPS, cell triangulation, and/or RSS. In another embodiment, the current location of the individual 750 within the conveyance system may be determined by: detecting a wireless signal of a mobile device 600 being carried by an individual; and determining RSS of the mobile device 600; and determining an elevation of the individual in response to the RSS of the mobile device 600.

The method 500 may also include that the location of the individual 750 within the conveyance system is displayed on the display device 650. The location of the individual 750 is displayed relative to the health level 710 for the conveyance system at the first conveyance apparatus location 730a. The current location of the conveyance apparatus 720 may also be determined and displayed on the display device 650. The health levels 710 may be displayed in detail as time series data in selectable time periods.

The method 500 may further comprise: at a second conveyance apparatus location 730b an acceleration 312 of the conveyance apparatus, temperature data 316 of the conveyance system, and pressure data 314 proximate the conveyance apparatus is detected using a sensing apparatus 210. A health level 710 of the conveyance system at the second conveyance apparatus location 730b is determined in response to at least one of the acceleration 312 of the conveyance apparatus, the temperature data 316 of the conveyance system, and the pressure data 314 proximate the conveyance apparatus. Then the health level 710 for the conveyance system at the second conveyance apparatus location 730b may be displayed on a display device 650.

The method 500 may also include that a second identifier 740b for the second conveyance apparatus location 730b is determined. The second identifier 740b may also be displayed on the display device 650. The health level 710 for the conveyance system at the second conveyance apparatus location 730b and the second identifier 740b for the second conveyance apparatus location may be displayed simultaneously with the health level 710 for the conveyance system at the first conveyance apparatus location 730a and the first identifier 740a for the first conveyance apparatus location 730a may be displayed on a display device 650, as shown in FIG. 6. The method 500 may further comprise: normalizing the second identifier 740b for the first conveyance apparatus location 730a to a standard value. The first identifier 740a and the second identifier 740b may be normalized before each are displayed.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of monitoring a conveyance apparatus within a conveyance system, the method comprising:
    obtaining a health level of the conveyance system at a first conveyance apparatus location;
    determining that the health level for the conveyance system at the first conveyance apparatus location is outside of a threshold operating range;
    activating an alert on a mobile device indicating that the health level for the conveyance system at the first conveyance apparatus location is outside of the threshold operating range; and
    receiving a selection input on the mobile device, the selection input indicating a mechanic feedback regarding the health level of the conveyance system at the first conveyance apparatus location;
    wherein receiving the selection input on the mobile device further comprises:
    displaying a plurality of mechanic feedback options on the mobile device; and
    receiving a selection input on the mobile device selecting one of the plurality of mechanic feedback options indicating the mechanic feedback.

2. The method of claim 1, further comprising:
    displaying the health level for the conveyance system at the first conveyance apparatus location on a display device of the mobile device.

3. The method of claim 1, further comprising:
    adjusting the alert in response to the mechanic feedback.

4. A method of monitoring a conveyance apparatus within a conveyance system, the method comprising:
    obtaining a health level of the conveyance system at a first conveyance apparatus location;
    determining that the health level for the conveyance system at the first conveyance apparatus location is outside of a threshold operating range;
    activating an alert on a mobile device indicating that the health level for the conveyance system at the first conveyance apparatus location is outside of the threshold operating range;
    receiving a selection input on the mobile device, the selection input indicating a mechanic feedback regarding the health level of the conveyance system at the first conveyance apparatus location; and
    adjusting the threshold operating range in response to the mechanic feedback.

5. A method of monitoring a conveyance apparatus within a conveyance system, the method comprising:
    obtaining a health level of the conveyance system at a first conveyance apparatus location;
    determining that the health level for the conveyance system at the first conveyance apparatus location is outside of a threshold operating range;
    activating an alert on a mobile device indicating that the health level for the conveyance system at the first conveyance apparatus location is outside of the threshold operating range;
    receiving a selection input on the mobile device, the selection input indicating a mechanic feedback regarding the health level of the conveyance system at the first conveyance apparatus location; and
    identifying a root cause that caused the health level for the conveyance system at the first conveyance apparatus location to be outside of the threshold operating range.

6. The method of claim 1, wherein the mechanic feedback identifies a root cause that caused the health level for the conveyance system at the first conveyance apparatus location to be outside of the threshold operating range.

7. The method of claim 5, wherein the mechanic feedback confirms the root cause that was identified.

8. The method of claim 5, wherein the mechanic feedback rejects the root cause that was identified.

9. The method of claim 1, wherein obtaining the health level of the conveyance system at the first conveyance apparatus location further comprises:
    detecting, using a sensing apparatus, at the first conveyance apparatus location an acceleration of the conveyance apparatus, temperature data of the conveyance system, and pressure data proximate the conveyance apparatus; and
    determining a health level of the conveyance system at the first conveyance apparatus location in response to at least one of the acceleration of the conveyance apparatus, the temperature data of the conveyance system, and the pressure data proximate the conveyance apparatus.

10. The method of claim 1, further comprising:
    determining a first identifier for the first conveyance apparatus location; and
    displaying first identifier for the first conveyance apparatus location on a display device.

11. The method of claim 1, further comprising:
    determining a current location of an individual within the conveyance system; and
    displaying the location of the individual within the conveyance system on a display device.

12. The method of claim 10, wherein prior to displaying the first identifier for the first conveyance apparatus location on a display device, the method further comprises:
    normalizing the first identifier for the first conveyance apparatus location to a standard value.

13. The method of claim 11, wherein determining the current location of the individual within the conveyance system, further comprises:
    detecting an ambient air pressure proximate the individual; and
    determining an elevation in response to the ambient air pressure.

14. The method of claim 11, wherein determining the current location of the individual within the conveyance system, further comprises:
    detecting a wireless signal of a mobile device being carried by the individual; and
    determining received signal strength of the mobile device; and determining an elevation of the individual in response to the received signal strength of the mobile device.

15. method of claim 11, wherein determining the current location of the individual within the conveyance system, further comprises:
   determining that the individual is currently located within the conveyance apparatus;
   determining a current location of the conveyance apparatus; and
   determining that the current location of the individual is equivalent to the current location of the conveyance apparatus.

16. The method of claim 1, wherein the conveyance system is an elevator system and the conveyance apparatus is an elevator car.

17. A method of monitoring a conveyance apparatus within a conveyance system, the method comprising:
   obtaining a health level of the conveyance system at a first conveyance apparatus location;
   displaying a health level of the conveyance system at the first conveyance apparatus location on a display device of a mobile device;
   receiving a selection input on the mobile device, the selection input indicating a mechanic feedback regarding the health level of the conveyance system at the first conveyance apparatus location; and
   adjusting the health level of the conveyance system at the first conveyance apparatus location in response to the mechanic feedback.

18. A system for monitoring a conveyance apparatus within a conveyance system, the system comprising:
   a processor; and
   a memory comprising computer-executable instructions that, when executed by the processor, cause the processor to perform operations, the operations comprising:
   obtaining a health level of the conveyance system at a first conveyance apparatus location;
   determining that the health level for the conveyance system at the first conveyance apparatus location is outside of the threshold operating range;
   activating an alert on a mobile device indicating that the health level for the conveyance system at the first conveyance apparatus location is outside of the threshold operating range;
   receiving a selection input on the mobile device, the selection input indicating a mechanic feedback regarding the health level of the conveyance system at the first conveyance apparatus location;
   wherein receiving the selection input on the mobile device further comprises:
   displaying a plurality of mechanic feedback options on the mobile device; and
   receiving a selection input on the mobile device selecting one of the plurality of mechanic feedback options indicating the mechanic feedback.

* * * * *